Oct. 22, 1929.  W. F. HILLPOT  1,732,891
INCUBATOR
Filed July 5, 1927   4 Sheets-Sheet 1
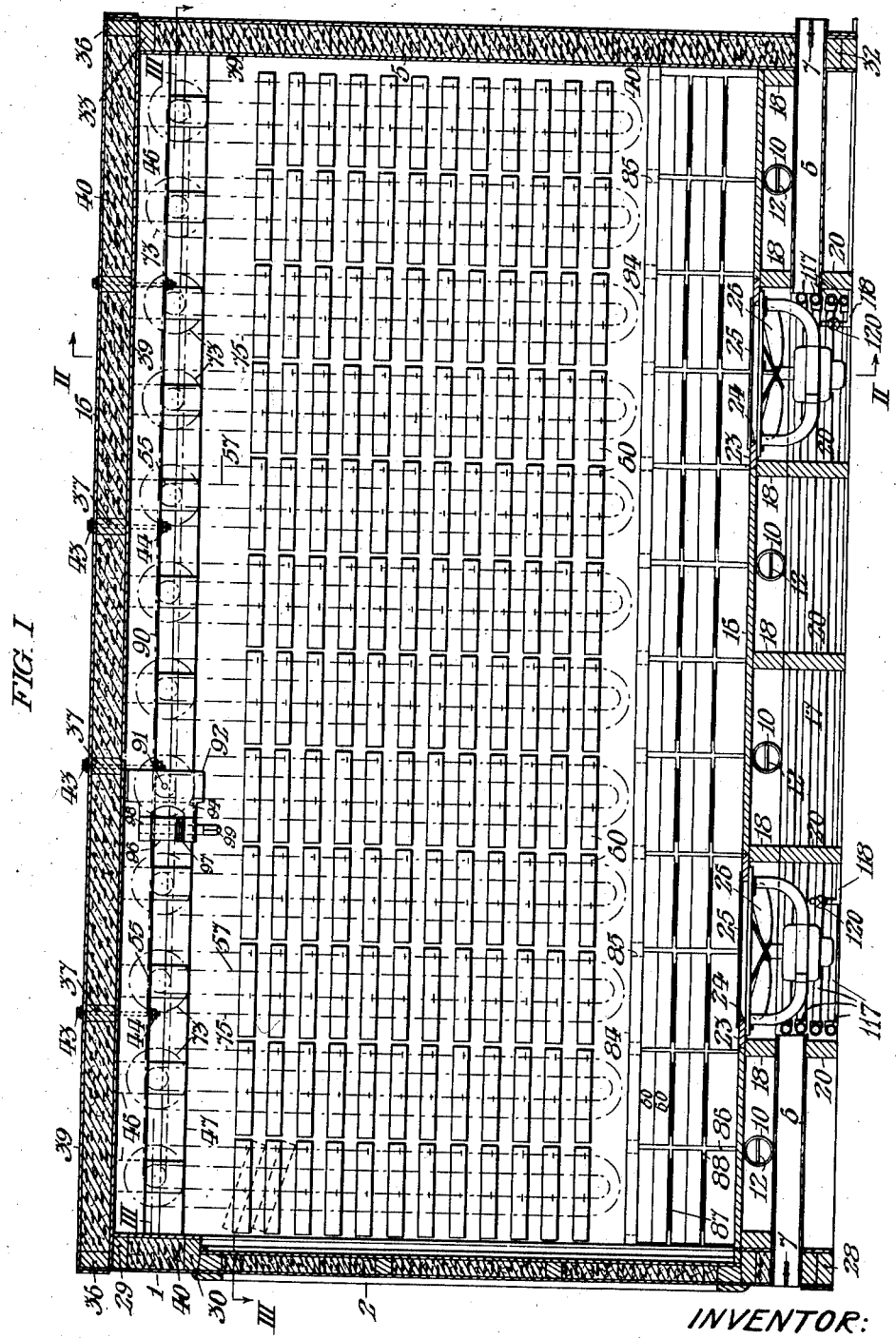
FIG. I
INVENTOR:
WILLIAM FINNEY HILLPOT,

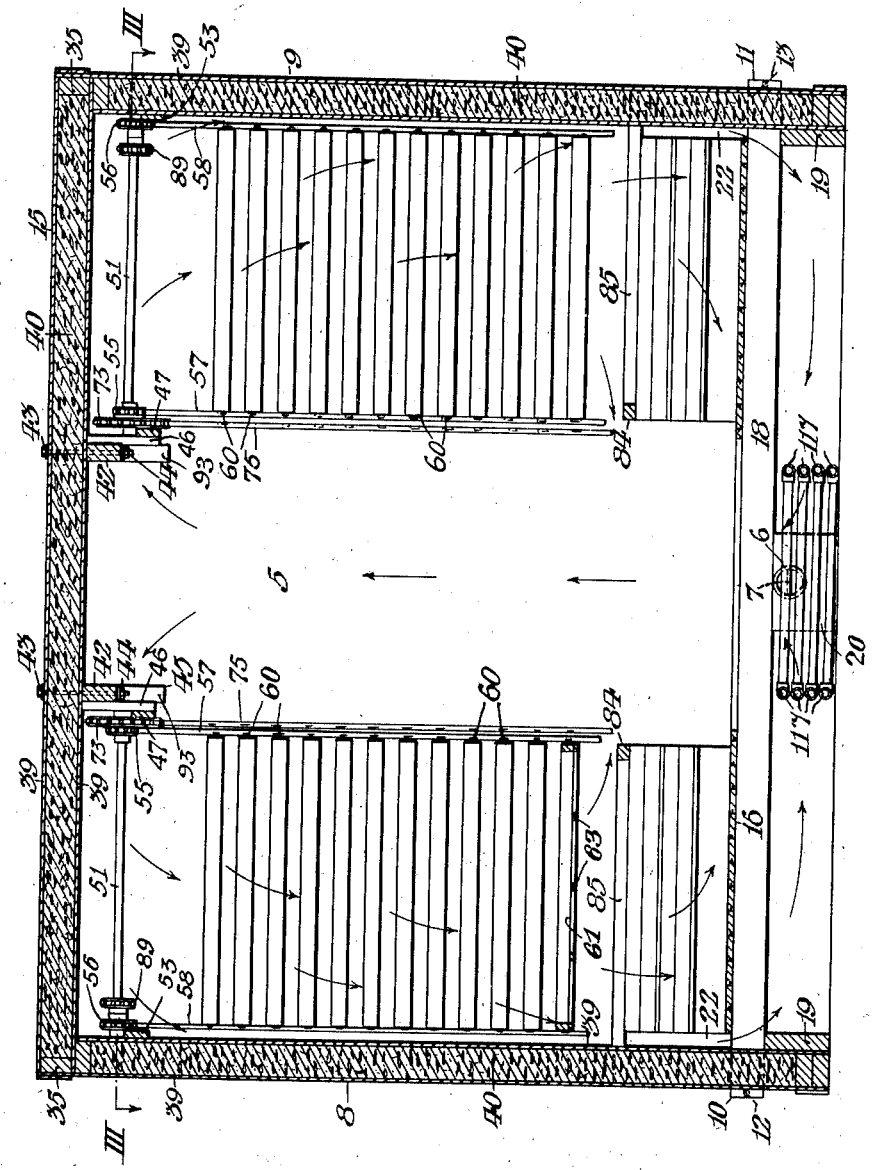

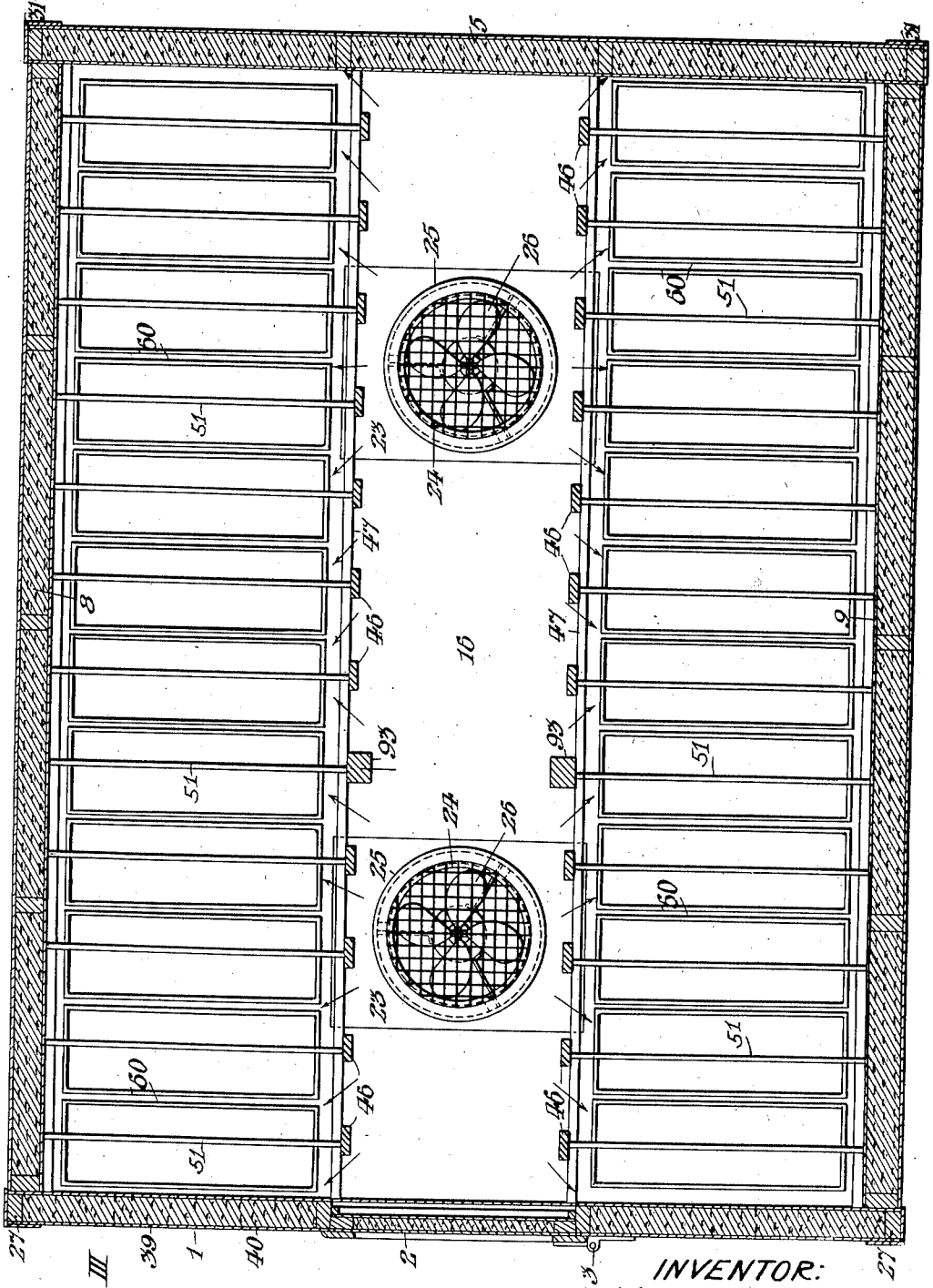

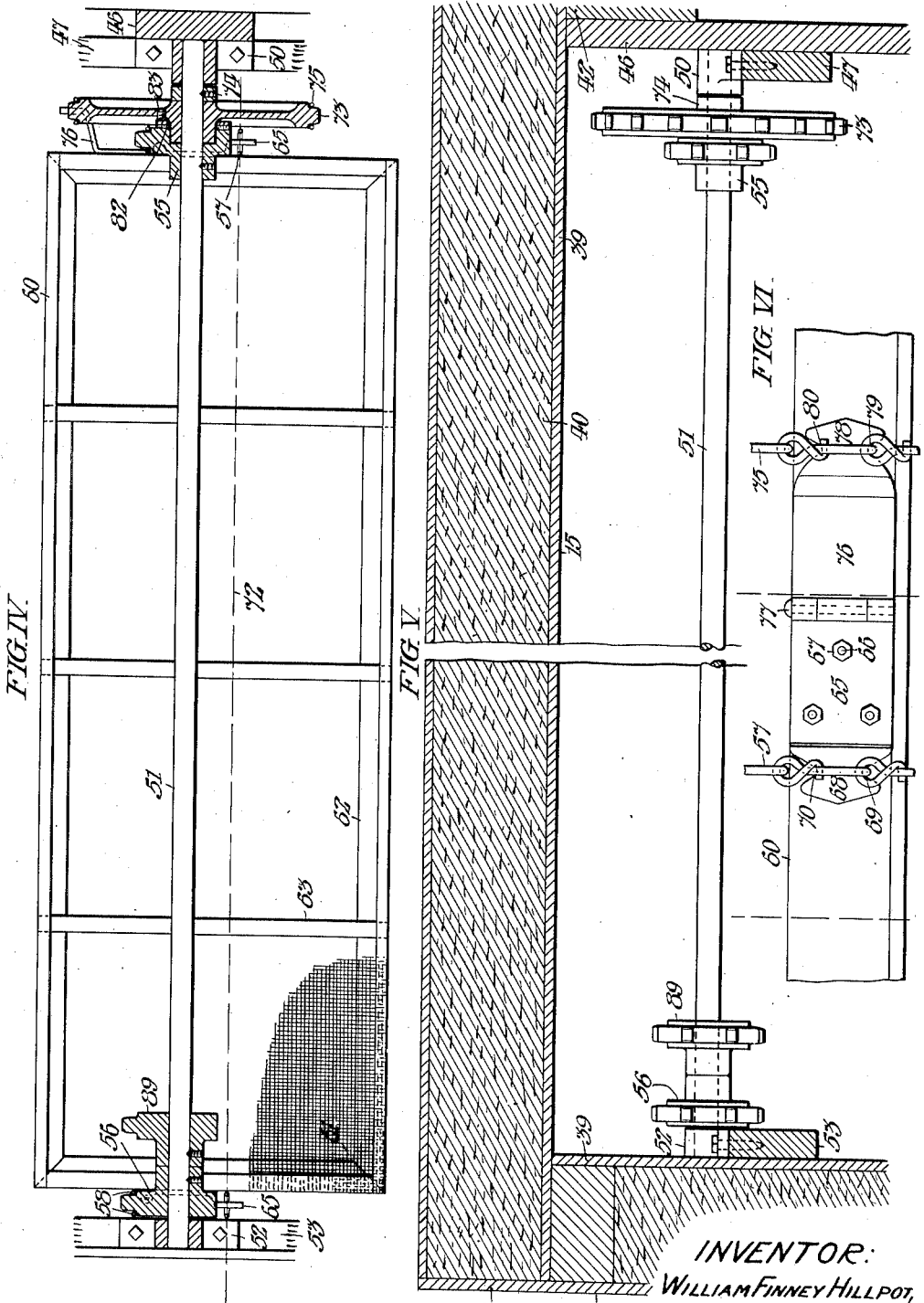

Patented Oct. 22, 1929

1,732,891

UNITED STATES PATENT OFFICE

WILLIAM FINNEY HILLPOT, OF FRENCHTOWN, NEW JERSEY

INCUBATOR

Application filed July 5, 1927. Serial No. 203,460.

It is the object of my invention to provide means for supporting eggs, during the period of incubation thereof, in such manner that the eggs may be repeatedly turned, at intervals, in simulation of the turning movements naturally imparted to such eggs by the mother birds, and in such environment as to afford the desired degree of warmth during such period, while maintaining the eggs in such relation to each other that they may be individually inspected at any time.

My improvements are particularly applicable to incubators of the class disclosed in Letters Patent of the United States granted to me and respectively No. 1,489,597 dated April 8, 1924, and No. 1,545,425 dated July 7, 1925; in that the egg supports are suspended upon endless flexible connectors, conveniently chain belts, so that such supports may be shifted to positions of inclination in different directions, with consequent changes in position of the eggs carried thereby, and may be shifted by said belts from a region of charge to a region of discharge of the eggs, as distinguished from incubators of the prior art in which it is necessary to manually remove and replace the eggs with respect to supports upon which they rest in successive steps from the region of charge to the region of discharge.

As hereinafter described, I find it convenient to provide egg supporting means including trays which are rectangular frames open at the top but covered at the bottom with foraminous material, such as insect wire screening; each of said trays having, at opposite ends thereof, axially alined pivot means in eccentric relation to the center of gravity of the tray and adapted to engage in links of the chain belts so that each of the trays is normally overbalanced to one side, so as to assume a position of inclination in that direction, unless otherwise detained, and I provide means for temporarily detaining each tray, in the opposite position of inclination, against the gravitative effect of its overbalancing aforesaid. Of course, allowance must be made, in the area of such egg trays, for the fact that eggs are of different sizes as well as to afford sufficient space to permit the aforesaid turning movement of the eggs. Consequently, it is practically impossible to maintain the egg trays balanced upon central pivots owing to the displacement of the eggs in the trays.

The effect of my improved construction and arrangement is that each tray rests stably in either position of inclination, as distinguished from devices of the prior art in which the trays are balanced upon pivotal connections extending coaxially in planes coincident with the center of gravity of the trays; so that the latter may be accidentally tilted in either direction by such disturbances of equilibrium of the tray and its contents incident to irregularities in the placement of the eggs in the trays. As hereinafter described; such egg trays are suspended in tiers in vertical columns or groups supported by chains at opposite ends of the trays.

An adjunctive feature of my invention is that means are provided for contemporaneously shifting a plurality of such vertical tiers of trays. Moreover, such means connecting the groups of trays for contemporaneous movement may be automatically and chronologically controlled; so that each tray may be automatically progressed from the position in which a fresh egg is placed therein to the position in which a chick is hatched therefrom and ready to be discharged. As hereinafter described, such control mechanism may include a pendulum.

My invention includes the various novel features of construction and arrangement hereinafter more definitely specified.

The method of and means for circulating air in an incubator to and from a chamber beneath a false floor, as described herein, are the subject matter of my divisional application Serial No. 357,611 filed April 24, 1929, for Letters Patent of the United States.

In said drawings; Fig. I is a longitudinal sectional view of an incubator conveniently embodying my improvement.

Fig. II is a transverse sectional view of said incubator, taken on the line II, II in Fig. I, in the direction of the arrows.

Fig. III is a horizontal plan sectional view taken on the line III, III in Figs. I and II.

Fig. IV is a fragmentary, partly sectional, plan view of the structure indicated in Fig. III; showing one of the egg trays at the upper portion of Fig. III with the shaft and sprocket wheels by which a vertical series of such trays are supported for simultaneous movement.

Fig. V is a fragmentary vertical sectional view of the upper left hand corner of the incubator structure shown in Fig. II showing an elevation of the tray supporting shaft and wheels indicated in Fig. IV.

Fig. VI is a fragmentary end elevation of the right hand end of the tray shown in Fig. IV and showing the configuration of the hook ends of the pivotal tray support.

In said figures; the rectangular incubator inclosure comprises the front wall 1 provided with the door 2 which is conveniently hinged at 3. Both said front wall and the rear wall 5 are conveniently provided with fresh air inlet ports 6 controlled by respective valves 7, but said rear wall may be otherwise imperforate, as shown, or may have a door similar to the door 2. The opposite side walls 8 and 9, of the incubator inclosure, may be imperforate, except for series of air vents 10 and 11 which are disposed at convenient intervals throughout the length thereof and respectively controlled by valves 12 and 13. The ceiling 15, supported by said four walls 1, 5, 8, and 9, may be imperforate as indicated. I find it convenient to form the floor 16 of said incubator inclosure of boards extending above a base compartment or cellar 17 and supported by transversely extending joists 18 resting upon sills 19 respectively adjoining said walls 8 and 9 and supported intermediate of the width of the inclosure by blocks 20. Said floor is of less width than said inclosure so as to afford air passageways 22 along the opposite side walls 8 and 9, and said floor is provided, intermediate of its width, with two doors 23, having respective air ports 24 each covered with a removable grill 25. Said doors each support an electric fan 26 arranged to progress air through said ports 24.

Said front wall 1 is conveniently formed of vertical wooden studs 27 connected by double sills 28 and the single cap member 29 and the lintel 30 for the doorway for said door 2. The rear wall is conveniently formed of vertical studs 31 connected by double sills 32 and the single cap member 33. Said ceiling 15 is conveniently formed of longitudinal joists 35 connected by transverse timbers 36 respectively above said walls 1 and 5, and by intermediate timbers 37, as indicated in Fig. I.

The wall frames above described are sheathed inside and outside with comparatively thin sheet material 39 such as the artificial lumber known as celotex, (which is a web of compressed matted cane fibers) and inclose heat insulating material 40 such as comminuted cork.

Intermediate of the width of said incubator structure, a pair of timber stringers 42 are suspended in parallel spaced relation by bolts 43 extending through the intermediate ceiling timbers 37 and provided with nuts 44. Said stringers 42 support, in suspension from the ceiling 15, the frame 45 comprising vertical hangers 46, disposed in the spaced relation indicated in Figs. I and III, and connected by the longitudinal frame members 47 indicated in Figs. II and III.

As indicated in Figs. IV and V, said longitudinal frame members 47 are rails supporting the bearings 50 for the tray supporting shafts 51, which have their opposite ends journaled in the bearings 52 supported by the rails 53 which extend parallel with said rails 47. The location of said shafts 51 with reference to the respective tiers of trays 60 is indicated by the axial dash lines in Fig. III; the latter being a view taken below the plane of said shafts and the mechanism appurtenant thereto. Each of said shafts 51 has, rigidly connected therewith, one sprocket chain wheel 55 and one sprocket chain wheel 56; carrying the tray supporting endless chains 57 and 58, which are respectively pendent at opposite ends of groups of twelve trays 60, arranged in tiers in a vertical column.

Each of said trays 60 includes a rectangular frame, open at the top and closed at the bottom with a web of foraminous material 61 such as insect wire screening held in place by wooden strips 62 and 63. Each of said trays has, at opposite ends thereof, pivot plates 65 rigidly connected therewith, conveniently by bolts 66 and nuts 67. Said plates 65 have double hook members 68, forming bottom hook recesses 69 for pivotal engagement with the respective chains 57 and 58. The upper hook recesses 70 receive the cross bars of the chain links in such manner as to limit the tilting movement of the trays upon the cross bars of said chains which are engaged in said recesses 69; when such tilting movement is clockwise with reference to Fig. VI. Each of the trays 60 has its axis of oscillation upon said chains 57 and 58, (which axis is indicated by the dash line 72 in Fig. IV,) in eccentric relation to the center of gravity of the tray, so that the latter is overbalanced to tilt clockwise with reference to Fig. VI when free to do so. However, the tilting movement of said trays is controlled by providing each of said shafts 51 with a sprocket wheel 73, which may be turned thereon but which is prevented from axial displacement by the collar 74 fixed on said shaft, as indicated in Fig. IV, in opposition to the chain wheel 55. Each of said sprocket wheels 73 carries a tray tilting endless chain 75; so that there is one such tilting chain for each column of trays 60 and detachably engaged with the latter by respective hinge plates 76 which are hingedly connected with said pivot plates 65 by respective pintles 77. Said plates 76 have double hook members 78 forming bottom hook recesses 79 and upper hook recesses 80 for engagement with the cross bars of the links of said chains 75 as indicated in Figs. IV and VI. The tilting movement of the trays 60 upon said chains 75, counter-clockwise with reference to Fig. VI, is limited by the hook members 78 encountering the cross bars of said chains. Said hinge members 76 are hingedly connected with the trays 60 so as to permit the chains 75 connected therewith to be spread apart, as far as possible, to permit the insertion and removal of the trays with respect to their assembled position indicated in Fig. I. However, the normal position of each hinge member 76 is that indicated in Figs. IV and VI. The construction and arrangement above described are such that it is only necessary to use said tilting chains 75 to tilt the trays 60 clockwise with reference to Fig. VI and, when thus tilted, said chains may be temporarily detained with the trays in that position by the friction rings 82 which are axially adjustable by the screws 83 on said wheels 73 and frictionally engage the wheels 55.

The tilting movements of said trays are limited by the relation of the chains to the pivot plates. The frame members 84 are connected with the opposite side walls 8 and 9 by cross bars 85 indicated in Figs. I and II, and are rigidly connected with vertical partition members 86, forming series of tray compartments 87 as indicated in Fig. I, and and having horizontal shelf flanges 88 to receive trays 60 which are removed from the supporting chains 57 and 58 and placed in said compartments 87, when the eggs therein are about to hatch; so that the hatching is conveniently effected near the floor of the incubator where the chicks may be conveniently handled. Said shelf flanges 88 are so spaced vertically as to receive two trays 60 between them, the upper tray being empty and inverted so as to form, with the lower tray, a cage preventing the escape of the hatched chicks until the covering tray is manually removed.

Said chains 57 and 58 are arranged to be progressed by rotation of said shafts 51, counter-clockwise with reference to Fig. I, so as to lower said trays 60 from the top to the bottom of each column suspended by said chains. Such progression of the trays may be effected intermittently or continuously and, in either case, the operation of the chains 75 may be so timed with respect to the movements of the chains 57 and 58, that the movement of the latter, with the chains 75 engaged with their wheels 73 frictionally held rigid on the shafts 51, tilts the trays 60 counter-clockwise with reference to Figs. I and IV as above described; so that it is only necessary to move the chains 75 once for every two complete tilting movements of the trays.

In the form of my invention indicated in Figs. I, IV and V; I have provided each of said shafts 51 with a sprocket gear 89, which is similar to the sprocket gear 55, but which engages an endless chain 90, indicated in Fig. I, which is common to such gears 89 on the twelve shafts 51 arranged upon one side of the incubator and thus connects that series of shafts for contemporaneous control by said single chain 90. The arrangement above described is such that the weight of the trays 60 in the respective columns tends to turn each of the shafts 51 counter-clockwise with reference to Fig. I, and I find it convenient to control such tendency by providing one of the shafts 51 with an extension 91 journaled in the bracket 92 on the timber 93 and provided with the worm gear 94, which is rigidly connected with that shaft 51 and engaged by the worm 96 which is journaled in said bracket 92 and provided with the thrust bearing 97 surrounding its shaft 98, the lower end of which is squared at 99 or otherwise adapted to receive a wrench by which said worm 96 may be manually turned, at intervals, to permit said trays 60 to gravitatively progress downward with their chains 57 and 58 toward the compartments 87 in which the chicks are to be hatched.

As indicated in Fig. III, the columns of said trays 60 suspended by the chains 57 and 58 are arranged in similar series upon opposite sides of the central corridor in which the operator may manipulate the trays and chains as above described.

The construction and arrangement above described are such that trays 60 containing fresh eggs may be hooked into engagement with the chains 57 and 58 at the top of the respective columns, lowered to the bottom thereof by movement of said chains and withdrawn from the bottom of each column for insertion in the compartments 87 when the chicks are about to hatch; the trays containing fresh eggs being inserted at the tops of the columns at the times when the trays are removed from the bottom of the columns.

The form of my invention shown may be advantageously employed to effect what is known as "stage" incubation, in which eggs in various stages of incubation are contemporaneously present in the incubator, with the effect that the incubator may be used to hatch chicks every day instead of at intervals of the gestation period of twenty-one days and with the advantage that chicks thus produced are more readily marketed.

The chains 57 and 58 being free from trays 60; one or two trays containing fresh eggs, preferably with their longitudinal axes substantially vertical and the smaller ends of the eggs downward, may be suspended at the top of each of the twenty-four columns; each tray being overbalanced, clockwise, and tilted as shown in broken lines at the upper left hand part of Fig. I, so that each egg is tilted toward the right. Each tray is preferably tilted in the opposite direction, at intervals of six or eight hours. Such tilting may be effected, without turning movement of the shafts 51, by pulling down upon the portion of each chain 75 not engaged with the hinge plate 76, to the limiting angle permitted by the latter, and each tray is detained in such position by the friction rings or other suitable means. After remaining at the same elevation for a time, said trays 60 may be lowered by counter-clockwise movement of the shafts 51, effected by manually turning the worm shaft 98 local to each group of twelve columns of trays. Such lowering movement of the trays may be so timed as to effect the tilting movement of the trays previously suspended in the chains 57 and 58, without manipulation of the tilting chains 75. For instance, the trays may be allowed to remain stationary, tilted as shown in broken lines in Fig. I, for a period of six or eight hours. Then the shafts 51 may be turned, bodily lowering the trays by their supporting chains 57, while their right hand edges are prevented from lowering by pivotal connection with the chains 75 which remain stationary; thus tilting the trays counter-clockwise until they slant downward to the left. After remaining in that position for six or eight hours, the chains 75 may be moved to again tilt the trays clockwise, until they slope downward toward the right, without turning movement of the shafts 51 or lowering movement of the chains 57.

The operation above described may be repeated, and trays containing fresh eggs added at the top of each column, at suitable intervals, until the eggs in the lowermost trays suspended in the chains 57 and 58, are ready to hatch. Thereupon, trays may be removed from the chains and placed in the compartments 87, with empty trays 60 inverted over them to prevent the escape of the chicks. Of course, the removal of the lowermost trays may be effected at one of the intervals of time at which trays containing fresh eggs have been inserted at the tops of the columns; so that the apparatus is operated with a predetermined regularity or rhythm of steps in the incubating process.

When the eggs in the trays in the compartments 87 have been hatched; those trays may be withdrawn from said compartments and the chicks removed therefrom for shipment and the shell débris discarded.

I find it convenient to thus operate said incubator by the addition and subtraction of two trays per day with respect to each column; so that the contents of forty-eight trays are hatched every day instead of the contents of two hundred and eighty-eight trays being hatched at intervals of twenty-one days, as would be the case if all of the trays were contemporaneously charged with fresh eggs.

However, I do not desire to limit myself to the specific method of incubation above described, as it is obvious that the incubator aforesaid may be otherwise used.

The fans 26 are operated, preferably continuously, during the incubating operation to agitate the air within the incubator inclosure and introduce fresh air at such a rate as is most efficient for the purpose of incubation. The rate of admission of fresh air may be variably determined by controlling the effective area of the fresh air inlet ports 6, by the valves 7, and the escape of foul air may be effected by coordinate control of the effective area of the air vents 10 and 11 by the respective valves 12 and 13.

It is to be particularly noted that said fans 26 are preferably so operated as to draw the air upwardly through the ports 24 in the doors 23, thus creating a partial vacuum below said doors, inducing the inflow of fresh air through the ports 6 and subjecting the air to pressure throughout the other portions of the incubator inclosure, so that it has a tendency to escape from said vents 10 and 11 along the side walls 8 and 9 of the incubator.

The air thus agitated in the incubator inclosure, is forced downwardly with respect to the twenty-four columns of trays 60 as it is discharged upon opposite sides of the frame 45 in its distribution through the openings between the vertical hangers 46, as indicated by the arrows in Fig. III and, being forced downward through the passageways 22 along the opposite side walls 8 and 9; the major portion thereof, which does not escape through said vents 10 and 11, returns horizontally beneath said floor 16, to the fans 26, to be recirculated upwardly through the ports 24 in the doors 23, mixed with more or less fresh air drawn in through the inlet ports 6, as indicated by the arrows in Fig. II.

I have found it preferable to thus circulate the air downwardly between the eggs in the trays 60 because the hatched chicks at the bottom of the tiers of trays shed a considerable quantity of flocculent down which is discharged to the floor 16 and carried into the corridor by the flow of air in the direction of the arrows shown in Fig. II. If the air were circulated in the reverse direction, such flocculent material would be carried upward from the trays at the bottom of the incubating chamber against the screening of the superimposed trays with the effect of clogging the latter and obstructing the circulation of air therethrough.

As it is necessary to subject the eggs to a temperature of from 99° to 103° F., during the incubation thereof; it is necessary to provide means to warm the atmosphere in which the incubation is effected and particularly for environment of the eggs in the earlier stages of incubation; as the eggs in the preliminary stages of incubation absorb heat and the eggs in the later stages of incubation generate heat; incidentally absorbing moisture and oxygen from the surrounding air and adding carbon dioxide thereto in increasing quantities as the incubation proceeds. Therefore, the atmosphere in the incubator may be suitably warmed either by heating the air introduced through the ports 6, by means exterior to the incubator inclosure illustrated, or by the location of hot water or steam pipes 117 beneath said floor 16, as indicated in Fig. II, or otherwise. Moreover, it is desirable to provide means to variably determine the humidity of the atmosphere in the incubator inclosure and I prefer to provide a steam pipe 118, beneath said floor 16, as indicated in Fig. I, with minute orifices controlled by valves 120 through which steam may be permitted to escape and mix with the air passing to the fans 26.

However, I do not desire to limit myself to the precise details of construction and arrangement or method of procedure herein set forth, as it is obvious that various modifications may be made therein without departing from the essential features of my invention, as defined in the appended claims. For instance, the trays 60 and their contents may be lowered by automatic means in lieu of the manually operative escapement comprising the worm gear 94 and the worm 96 above described.

Such an automatic means is described and claimed in my copending application Serial No. 203,459 filed July 5, 1927, for Letters Patent of the United States, and said application includes claims covering certain essential features of my invention herein disclosed; particularly egg tray supporting mechanism comprising an endless chain used for tilting the trays in conjunction with endless chain supports for the trays. However, it is to be noted that in the specific form of my invention shown in said copending application, each tray is adapted to be engaged with the supporting chains and tilting chain upon the same side of the shaft from which the chains are suspended; whereas, in the specific form of my invention chosen for illustration herein, the trays are adapted to be connected with the supporting chains and tilting chain respectively upon opposite sides of the supporting shaft; with a consequently different operation and effect. Moreover, in said copending application, the trays are only prevented from tilting to one extreme of their movement by engagement with a stationary detent for each tier of trays; whereas, in the form of my invention herein set forth, no such independent detent means is required but the trays are held in any position to which they are tilted by the friction rings local to their supporting shafts. Furthermore, in the form of my invention shown in said copending application; the egg trays are arranged in two groups upon respectively opposite sides of a central corridor in the inclosure; which groups are oppositely counterpart; so that the trays intended for use upon opposite sides of said corridor are respectively different as to the location of the chain engaging plates thereon. On the contrary, in the embodiment of my invention herein shown; all of the trays may be alike in the location of the plates thereon for engagement with the chains. That is to say, with reference to Fig. III, any of the trays 60 may be removed from either side of the central corridor and be positioned for placing in the opposite side of the corridor, by turning it 180° in a horizontal plane. Of course, the arrangement herein disclosed is advantageous in facilitating the manipulation of the eggs with respect to their supports in the incubator.

I claim:

1. In an incubator, the combination with a series of egg trays; of a pair of tray supporting endless belts at respective ends of said trays; means for independently detachably pivotally mounting each tray upon said belts; a third, tray tilting, endless belt; and means for detachably engaging each of said trays with said third belt; whereby contemporaneous movement of said three belts contemporaneously progresses and effects tilting movement of a plurality of egg trays, and movement of said third belt, in the opposite direction with reference to the other belts, effects reverse tilting movement of said trays without interfering with the progression of said trays by such other belts.

2. In an incubator as in claim 1; means including a rotary shaft and wheels carried by said shaft; said tray supporting belt wheels being fixed on said shaft, and said tray tilting belt wheel being movable on said shaft.

3. In an incubator, mechanism constructed and arranged to progress egg trays in an incubator from a region of introduction to a region of discharge, and to tilt the eggs at intervals during such progression, including a shaft; a pair of belt wheels fixed on said shaft; a pair of tray supporting endless belts engaged with and pendent from said wheels respectively at the ends of said trays; a third belt wheel, movable on said shaft; a tray tilting endless belt engaged with and pendent from said third belt wheel; a series of egg trays having means at each end thereof arranged to pivotally engage said supporting belts and means arranged to pivotally engage said tilting belt, respectively upon opposite sides of said shaft; and means normally engaging said third wheel to turn with said shaft; whereby said trays may be contemporaneously lowered, and tilted in one direction, by turning movement of said shaft, and be tilted in the opposite direction by relative movement of said third wheel on said shaft.

In testimony whereof, I have hereunto signed my name at Frenchtown, New Jersey, this twentieth day of June, 1927.

WILLIAM FINNEY HILLPOT.